United States Patent [19]

Beneke

[11] 4,353,148
[45] Oct. 12, 1982

[54] ELECTRIC PRESSURE SWITCH

[75] Inventor: Wolfgang Beneke, Monchen-Gladbach, Fed. Rep. of Germany

[73] Assignee: Trützschler GmbH & Co. KG, Monchen-Gladbach, Fed. Rep. of Germany

[21] Appl. No.: 176,561

[22] Filed: Aug. 8, 1980

[30] Foreign Application Priority Data

Aug. 9, 1979 [DE] Fed. Rep. of Germany ....... 2932291

[51] Int. Cl.³ ........................ G01L 9/00; D01G 15/40
[52] U.S. Cl. ...................................... 19/105; 19/240; 73/749; 356/383
[58] Field of Search ................ 73/705, 714, 749, 37.7, 73/293; 19/239, 240, 105; 356/383, 375

[56] References Cited

U.S. PATENT DOCUMENTS

| 595,398 | 12/1897 | Louis | 73/749 |
| 2,882,520 | 4/1959 | Hass | 73/293 |
| 3,061,732 | 10/1962 | Milnes | 356/383 |
| 3,209,596 | 10/1965 | Kelly | 73/705 |
| 3,474,501 | 10/1969 | Jeanmaire | 19/239 |

FOREIGN PATENT DOCUMENTS 2658044  6/1978  Fed. Rep. of Germany ........ 19/240

OTHER PUBLICATIONS

IBM Technical Disclosure Bulletin, vol. 9, No. 9, Feb. 1967, p. 1121.

Primary Examiner—Donald O. Woodiel
Attorney, Agent, or Firm—Spencer & Kaye

[57] ABSTRACT

An electric pressure switch for use with textile machines and the like has a U-shaped tube filled with a liquid. One of the legs is above the liquid level in communication with a source of variable fluid pressure, for example a fiber feeding chute of a textile machine and this same leg, with the other leg, is provided with two or more vertically spaced detecting arrangements which detect changes in the position of the liquid level which occur as the fluid pressure fluctuates, and such detections are converted into electrical signals which can control various functions, such as the drive for fiber feeding devices or the like.

11 Claims, 6 Drawing Figures

ELECTRIC PRESSURE SWITCH

BACKGROUND OF THE INVENTION

The present invention relates to an electric pressure switch, and more particularly to an electric pressure switch which is suitable for use in detecting pressure fluctuations in textile machines, conduits, the feed channels, in the measure of fibrous web fluctuations and the like.

The invention will hereafter be described with reference to its use in textile machines, but it should be understood that it is not so limited and has a much wider area of applicability.

In textile machines it is common to measure fluctuations of air pressure within the e.g. feed channel of a fiber feeding installation, by directing the air against a diaphragm of elastomeric material which is provided with a metal surface. The metal surface has associated with it an inductive switch which in accordance with pressure fluctuations produces electrical signals; these act via a regulating device upon a setting instrumentality. This type of equipment operates quite satisfactorily, but it is rather expensive to construct and less costly alternatives are therefore desirable.

SUMMARY OF THE INVENTION

It is, accordingly, an object of the present invention to overcome the prior-art disadvantages.

A more specific object of the invention is to provide such an aforementioned less costly alternative to the prior art.

Still more specifically, it is an object of the invention to provide an improved electric pressure switch which is simple in its construction, reliable in its operation, and inexpensive to produce.

In keeping with the above objects, and still others which will become apparent hereafter, one feature of the invention resides in an electric pressure switch which, briefly stated, may comprise means defining a pair of communicating vessels each having an upper end portion, a body of liquid in the vessels, means for connecting the upper end portion of one of the vessels to a source of variable fluid pressure, and means for detecting fluctuations in the upper level of liquid in at least one of the vessels which occur in response to variations of the fluid pressure, the last-mentioned means including at least two liquid level detectors arranged at two different vertically spaced levels.

The variable fluid pressure thus acts upon the liquid level in the one vessel and varies the height of the liquid level, i.e. the liquid level may rise or may be caused to become lower, depending upon whether the pressure decreases or increases. The other vessel, which is appropriately connected with the first vessel, serves for compensation. One or the other of the vessels is laterally provided with a detecting system, for example a photoelectric detecting system which determines the position of the level of liquid in the container. Depending upon the position of the liquid level in the one container both of these detecting systems may be covered or free, and the liquid level is located between the two systems; depending upon the particular position of the liquid level at a given time, the detecting systems generate electrical signals. Thus, the pressure fluctuations in the conduit connecting the upper end portion of the one vessel with the soft variable fluid pressure, e.g. a carding machine or other textile machine, are converted in a simple manner into electrical signals. A pressure switch of this type can be inexpensively produced and has only a few parts so that it is not only inexpensive but also highly reliable in operation. Moreover, the desired value of the liquid level and the tolerance variations of the pressure fluctuations can be read directly by an operator.

Preferably, the value of the pressure in the pressure-supplying conduit is supplied directly to one vertical lake of a U-shaped tube the two lakes of which communicate via the bight and which together constitute the communicating vessel. One or the other of the upright lakes of the U-shaped tube then has the two detectors associated with it, which may be in form of light sensors, i.e. each detector may have a light source located at one side of the particular lake of the tube and a receiver at the other side of the particular lake, the receiver issuing electrical signals independence upon light impingement.

The tube lake from which readings are to be taken is preferably provided with a measuring scale so that the actual pressured value can be directly read off, thus permitting an operator immediately to determine whether fluctuations are taking place in the system and enabling him immediately to take corrected steps to limit these fluctuations to the permissible tolerance range. The liquid in the communicating vessels may be either clear (uncolored) or it may be colored if it is desired to make it more easily readable with the bare eye. It is, however, advantageous if light detecting devices are used which generate an electrical signal in the presence of clear liquid, i.e. liquid which is not colored, merely by the fact that the liquid level reaches and passes the level at which light is beamed from the source of the detector across the vessel to the receiver of the detector. It is also advantageous if the detectors are individually shiftable relative to one another and relative to the vessel, because this makes it possible to adjust the upper and lower limits of the tolerance range relative to the desired value. It is, however, also possible—and currently preferred—to make the detectors jointly moveable relative to the vessel. In this manner the desired value can be adjusted. Advantageously, the detectors are jointly mounted on a carriage which is shifted via a motor driven spindle. Of course, they can each be mounted on a separate carriage and the two carriages can be jointly shifted by a motor driven spindle. In this manner, an automatic adjustment of the desired value position can be readily achieved. The pre-selected desired value position can be automatically set with the aid of a servomotor independently of the production currently going on. The carriage is preferably provided with a sensing element, for example with a slide resistor, which is connected in a bridge circuit with reference to the indicator respectively the control console, so that a central desired value remote adjustment can be carried out not only for one machine but for several machines at a time, if necessary or desired. The governing value may for instance be the number of rotations per minute of the fiber receiving drum of a carding machine. Various of types of slide resistors may be used, for example a linear potentiometer or a helical potentiometer.

The pressure switch according to the present invention may be used, inter alia, for controlling the pneumatic transportation of textile fibers. It is also possible to convert in this manner the variable pressure in the in-feeding chute of a pneumatic fiber feeding arrangement into electrical signals.

The invention will hereafter be described with reference to some specific illustrated embodiments, as shown in the appended drawings. It is to be understood, however, that these are for purposes of explanation only and are not to be considered limiting.

DESCRIPTION OF PREFERRED EMBODIMENTS

Figure 1:
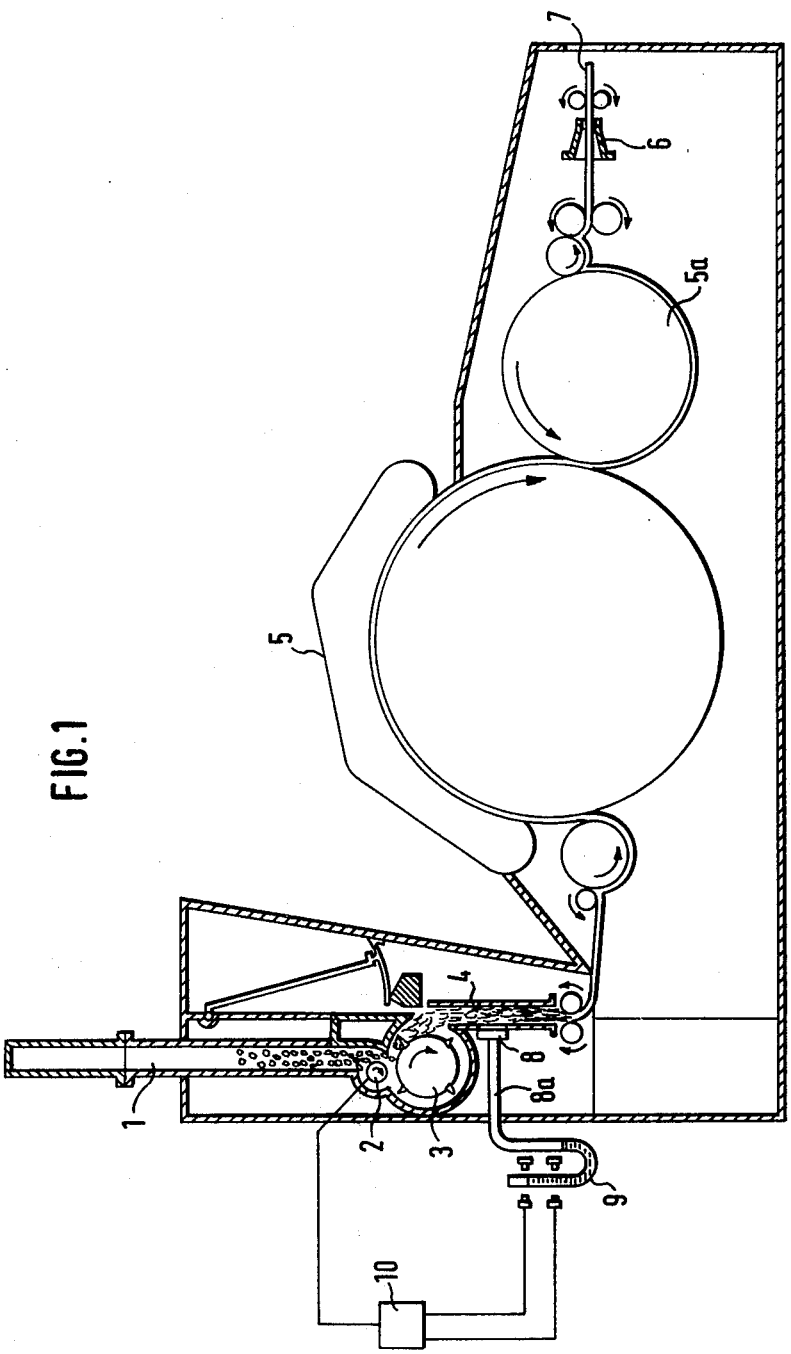
FIG. 1 is a schematic illustration showing a pressure switch according to the invention installed at the in-feeding chute of a fiber feeding installation for a carding machine.

Referring firstly to FIG. 1 it will be seen that textile fibers are supplied from a not-illustrated opening device through a supply and distributor line into an upper reserve conduit 1 of a fiber feeding arrangement, from where they are drawn via a draw-inroller 2 and an opening uproller 3 into a lower supply chute 4. From there, the fibers are advanced as a lap to a carding machine 5, and the web leaving the carding machine 5 is then advanced into a trumpet 6 where it is united to form a sliver 7.

One wall of the chute 4 is provided with an opening which is closed at the exterior by a cap 8 from which a line 8a leads to the pressure switch 9. The pressure switch 9 is connected via a regulator 10 with the not-illustrated drive for the drawing-inroller 2 of the chute 4. In operation, the pressure switch 9 measures the pressure prevailing in the chute 4 and produces an electrical signal which in turn produces via regulator 10 a signal acting upon the drive of the drawing-inroller 2.

Figure 2:
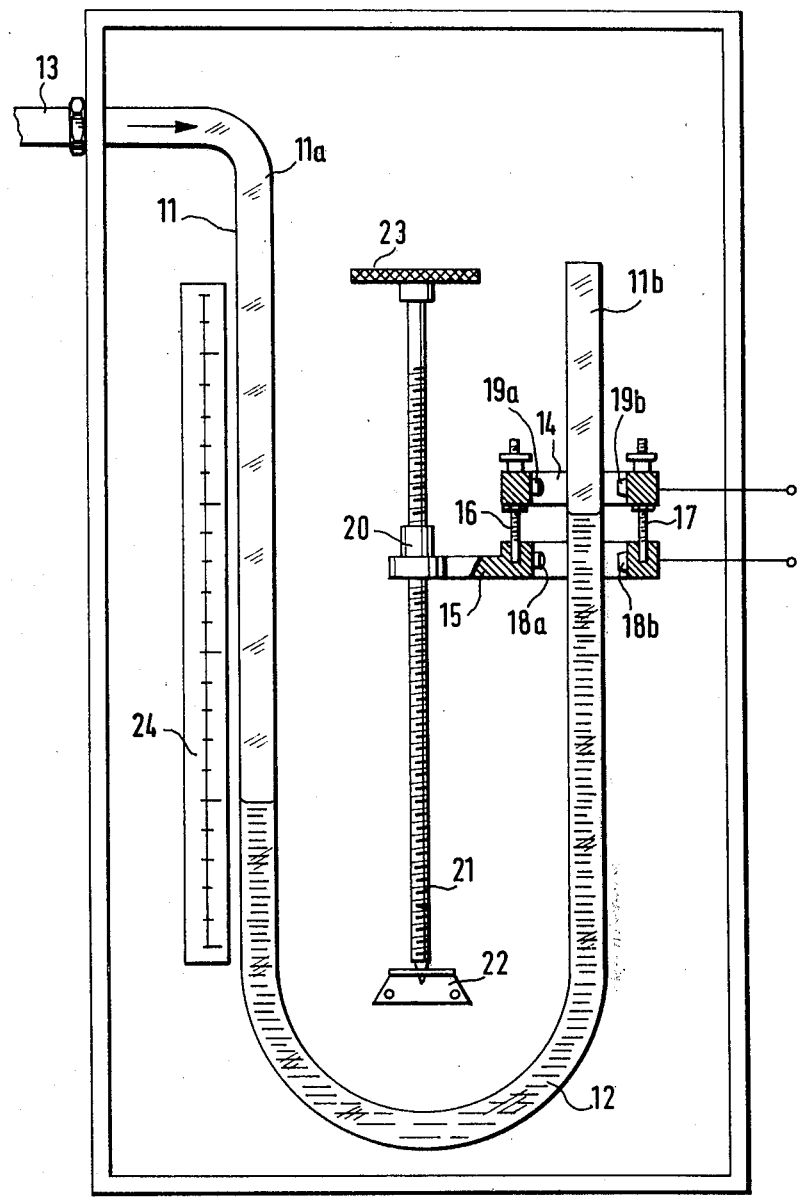
FIG. 2 is a detailed side elevational view, partly in section, showing a pressure switch according to the present invention.

The pressure switch 9 is illustrated in more detail in FIG. 2. In this embodiment the two communicating vessels of the pressure switch are formed by the upright legs 11a and 11b of a U-shaped tube 11; the legs 11a and 11b are connected by the bight of the U-shaped tube, as illustrated. The upper end of the leg 11a is connected to a pressure supply line 13 which leads to an installation (e.g. the one in FIG. 1) which is at variable pressure. Associated with the leg 11b (it could also be the leg 11a) are in this embodiment two vertically spaced carriages 14 and 15 which are adjustable relative to one another and relative to the elongation of the leg 11b by means of screw spindles 17, respectively. Mounted on each of the carriages 14 and 15 is a detector 18 and 19, respectively. The detector 18 is composed of a transmitter 18a (e.g. a light source) and a receiver 18b (e.g. a light receiver) which are located at opposite sides of the leg 11b. The detector 19 is similarly composed of a transmitter 19a and a receiver 19b. The transmitters and receivers are known per se and require no detailed discussion. The lower carriage 15 is mounted at one end 20 on a spindle 21 and can be vertically adjusted on the spindle 21. The lower end of the spindle 21 is turnably mounted in a fixed bearing 22 whereas the upper end of the spindle 21 has a setting nut 23 which is knurled at its periphery. By turning the nut 23 the detectors 18 and 19 can jointly be adjusted in vertical direction. Parallel to the leg 11a a measuring scale 24 is provided, although it could of course also be provided parallel to the leg 11b.

Pressure fluctuations which occur in the line 13 act upon the level of liquid in the leg 11a. This causes the liquid to be displaced upwardly or downwardly, as the case may be, in the leg 11b and the pressure switch perceives these fluctuations as electrical signals resulting from the movement of the liquid level in the leg 11b relative to the path of light of the detectors 18, 19, respectively and converts these pressure fluctuations into electrical signals. The detectors 18 and 19 are part of the pressure switch 9 and not of the regulator 10, as should be clearly understood. The receiver 18b, 19b receive the light from their respectively associated transmitters or sources and generate electrical signals which are supplied to the regulator 10 (e.g. a set of contactors or the like) which converts them to a further series of pulses which then act upon the motor of the roller 2.

Figure 3:
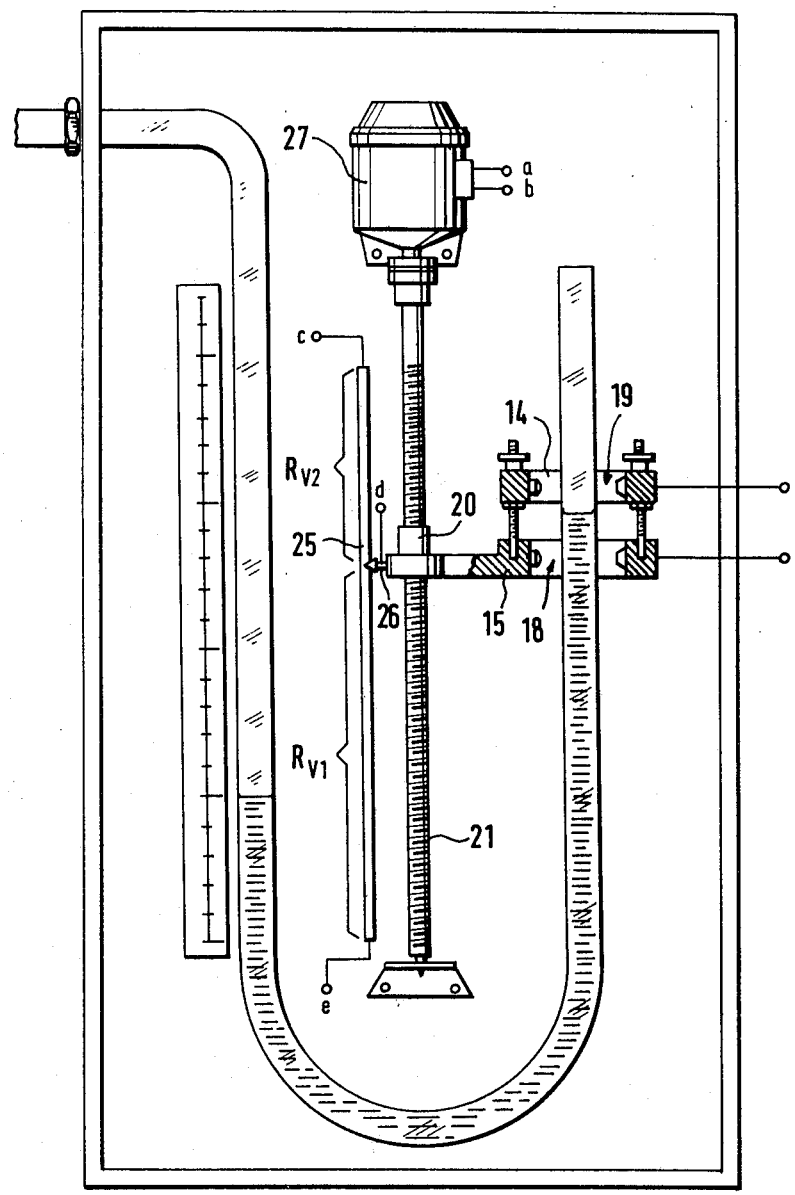
FIG. 3 is similar to FIG. 2, but showing the pressure switch with a servomotor.

The embodiment in FIG. 3 differs from the one in FIG. 2 in that a sliding potentiometer 25 is arranged parallel to the spindle 29 and has at its end electrical contacts c and e. The sliding potentiometer 25 is operated by a slide 26 provided at the end 20 of the carriage and which has a contact d. The upper end of the spindle 21 is connected with a motor 27 having two contacts a and b.

Figure 4A:
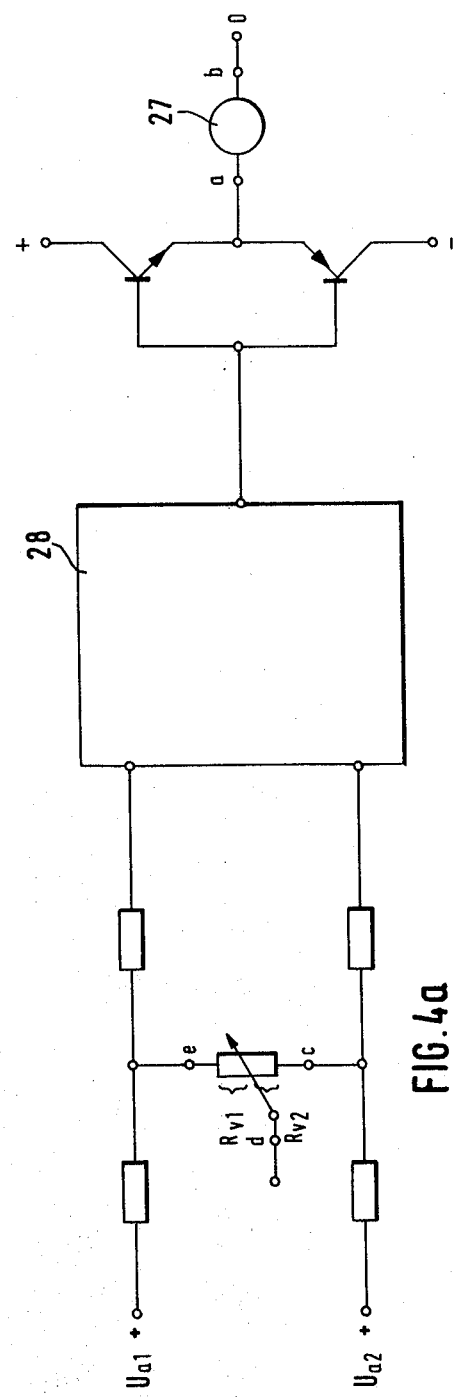
FIGS. 4a and 4b illustrate an electric circuit diagram for the device of FIG. 3.
Figure 4B:
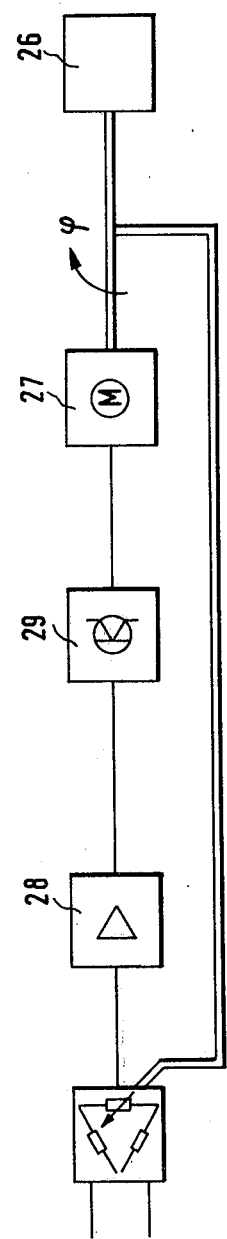

The electrical connection between the contacts a and b of motor 27 and the contacts c, d, and e of the sliding potentiometer 25 as shown in FIG. 3, is illustrated in more detail in FIGS. 4a and 4b. It will be seen that the two voltages $U_{a1}$ (predetermined fixed value) and $U_{a2}$ (variable voltage of a generator, derived e.g. at a tachomotor generator connected with the takeoff of the carding machine) are supplied to a resistance-type bridge circuit, the bridge being partly constituted by the potentiometer 25 connected with the motor 27. If the potentiometer 25 is in its center position and both input voltages are of identical value, then identical voltages are applied to the two partial resistors $R_{v1}$ and $R_{v2}$. As a result, no voltage difference develops at the bridge output. The subsequently arranged differential voltage amplifier 28—the working resistance of which, by way of a complementary terminal stage, is the motor 27—thus receives no input signal and the motor 27 does not operate. It will be noted, incidentally, that between the differential voltage amplifier 28 and the motor 27 there is arranged a driver circuit 29. If the input voltages differ from one another, a voltage difference develops at the resistance bridge so that the differential voltage amplifier 28 begins to operate (either in negative or in positive direction) and the motor 27 turns the potentiometer 25 via the spindle 21 in the desired direction until the voltage differential has been reduced to zero, i.e. until it has disappeared. In this position the motor 27 remains inactive until a new voltage change occurs at the terminals a and b.

Figure 5:
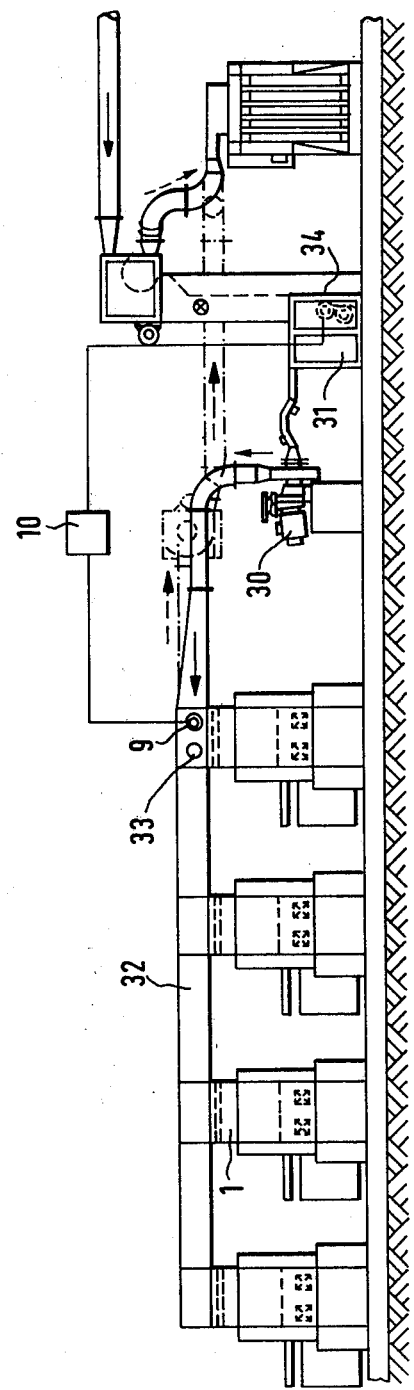
FIG. 5 illustrates the pressure switch according to the invention at the supply and distributor arrangement of a pneumatic fiber feeding system.

FIG. 5, finally, shows in a diagrammatic side view a fiber feeding arrangement. A transport fan 30 has a suction side which is connected to a fine opener 31. The ventilator 30 is also connected to a supply and distributor conduit 32 which extends above the carding-machine feeders and to which the reserve conduits 1 (compare FIG. 1) are connected. Above the first of the reserve conduits 1 the electric pressure switch 9 is mounted to the distributor conduit 32. The ventilator 30 draws the opened-up fibers from the output end of the fiber opening installation—e.g. the fine opener 31—and transports them in a stream of air through the conduit 32 to the reserve conduits 1. On entry of the fiber and air mixture into the conduits 1 the air escapes through the not-illustrated transporting air outlet filters and the fibers are yielded up to the reserve conduits 1 where they become deposited and form columns of fiber material. When the fiber columns begin to cover over the transport air outlet filters, the pressure in the conduit 32 rises. With increasing filling of the conduits 1 this pressure increase continues until finally it reaches its highest level—the pre-selected switching-off pressure—when the transport air outlet filters of all conduits 1 are completely covered over with fibers. At the beginning of the conduit 32, above the first of the conduits 1, there is provided a fine-response measuring device 33 (known per se) for indicating the pressure in millimeters water column and the pressure switch 9 for switching on or off the material supply from the device 31 to the ventilator 30. The pressure switch 9 is set to respond to a certain switching-off pressure. Once this is reached, the material transporting device of the fine opening device 31 is switched off. No further fiber material is then supplied to the ventilator 30. The ventilator 30, however, continues to operate except that now it supplies only air to the conduit 32 and thus maintains the pressure relationships. By material demand exerted upon the fiber columns in the conduits 1 via the chutes 4 (compare FIG. 1) fibrous material is drawn out of the reserve columns in the conduits 1 by the rollers 2 and the material reserve columns in the conduits 1 are slowly decreased. The transport air outlet filters thus gradually become partly exposed and the pressure is correspondingly reduced. When the pressure decrease reaches the switching difference set at the pressure switch 9, the material transporting device of the fine opener 31 is switched on again and fibers are again supplied by the device 31 to be drawn into the air stream of the ventilator 30 and conveyed to the reserve conduits 1. The pressure switch 9 is connected via a regulator 10, which may contain a time relay, with an electric drive motor 34 which drives via a not-illustrated steplessly variable transmission a not-illustrated opening roller, in the fine opener 31.

In the embodiments of FIGS. 1 and 5 the pressure switch 9 acts upon the roller 2 or the fine opener 31. However, it can evidently also operate upon other devices serving to vary a flow of fibers which is being transported. For example, the pressure switch can be used in any fiber feeding device for textile machines. Also, the pressure switch can be used with a pneumatic feeder, that is a box feeder for certain types of textile machines. Finally, the pressure switch 9 can also be used in combination with an actively or passively pneumatic trumpet 6 which is arranged subsequent to a carding device 5 in order to obtain a uniform sliver 7.

The invention has herein been illustrated with reference to particular embodiments shown in the drawings. However, it should be understood that various modifications and changes are possible which are intended to be encompassed within the scope of the appended claims.

I claim:

1. An electric pressure switch, comprising means defining a pair of communicating vessels each having an upper end portion; a body of liquid in said vessels; means for connecting the upper end portion of one of said vessels to a source of variable fluid pressure; means for detecting fluctuations in the upper level of liquid in at least one of said vessels which occur in response to variations of said fluid pressure, including at least two liquid level detectors arranged at two different vertically spaced levels; and mounting means supporting said detectors for joined displacement relative to and lengthwise of said one leg; said mounting means comprising a pair of carriages each mounting one of said detectors, and screw spindle means operatively connected with said carriages for jointly displacing the same.

2. A pressure switch as defined in claim 1, said vessel-defining means being a U-shaped tube having two upright legs, each provided with one of said end portions.

3. A pressure switch as defined in claim 2, said detectors each comprising a light source located at one and a light receiver located at the opposite side of one of said legs, said receivers generating electrical signals.

4. A pressure switch as defined in claim 2; and further comprising a pressure-value scale associated with one of said legs.

5. A pressure switch as defined in claim 1, wherein said liquid is a clear liquid.

6. A pressure switch as defined in claim 1; and further comprising means for displacing said detectors relative to each other.

7. A pressure switch as defined in claim 1, said mounting means further comprising an electric motor drivingly connected with said screw spindle means and having a pair of first terminals, and a sensor having one second contact and including a slide resistor with two additional second contacts, said first contacts being electrically connected with said second contacts.

8. A pressure switch as defined in claim 9, said sensor being responsive to changes in a variable voltage, and said source being a rotary element of a carding machine and rotating at variable speeds, said voltage varying in dependence upon variations of the rotary speed of said element.

9. A pressure switch as defined in claim 1; said source being a carding machine having a fiber feeding chute connected to said connecting means so that in-feeding rate of fibers can be controlled as a function of the measured pressure variations.

10. A pressure switch as defined in claim 1, said source being a carding machine having a pneumatic fiber feeding device connected to said connecting means so that the in-feeding rate of fibers can be controlled as a function of the measured pressure variations.

11. A pressure switch as defined in claim 1, said source being a carding machine having a pneumatic sliver trumpet connected to said connecting means so that the uniformity of a sliver passing through the trumpet can be controlled as a function of the measured pressure variations.

* * * * *